(12) United States Patent
Tabuti et al.

(10) Patent No.: US 6,601,992 B2
(45) Date of Patent: Aug. 5, 2003

(54) THRUST BEARING AND METHOD OF FABRICATING A THRUST BEARING

(75) Inventors: Hisatosi Tabuti, Tokyo (JP); Akio Hinata, Tokyo (JP); Yutaka Miyata, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 43 days.

(21) Appl. No.: 10/013,668

(22) Filed: Dec. 13, 2001

(65) Prior Publication Data

US 2002/0071619 A1 Jun. 13, 2002

(30) Foreign Application Priority Data

Dec. 13, 2000 (JP) .................................... 2000-378276

(51) Int. Cl.⁷ ............................ F16C 17/04; F16C 43/02
(52) U.S. Cl. ................... 384/420; 384/425; 29/898.041
(58) Field of Search ................................. 384/420, 424, 384/425, 427, 368, 121; 29/898.041

(56) References Cited

U.S. PATENT DOCUMENTS

| | | | | |
|---|---|---|---|---|
| 1,768,528 A | * | 6/1930 | Short ..................... | 29/898.041 |
| 3,346,302 A | * | 10/1967 | Robinson et al. ........... | 384/368 |
| 4,427,308 A | * | 1/1984 | Sandberg .................... | 384/115 |
| 4,569,601 A | * | 2/1986 | Ippolito ....................... | 384/95 |
| 6,471,807 B1 | * | 10/2002 | Shimoi et al. .............. | 156/175 |

* cited by examiner

Primary Examiner—Thomas R. Hannon
(74) Attorney, Agent, or Firm—Wenderoth, Lind & Ponack, L.L.P.

(57) ABSTRACT

An annular thrust bearing is composed of an annular backing plate made of steel and an annular bearing layer joined to one side of the backing plate during a sintering operation. The bearing layer is made of an alloy composed of copper, tin and silver. The bearing layer is roll-formed in a spiral fashion after the sintering operation.

4 Claims, 3 Drawing Sheets

THRUST BEARING AND METHOD OF FABRICATING A THRUST BEARING

BACKGROUND OF THE INVENTION

The present invention relates to thrust bearings and a method of fabricating thrust bearings.

Various thrust bearings are employed to facilitate sliding motion of a rotating body. A usual axial piston pump includes a cylinder block within which a plurality of piston shoes are arranged. A swash plate as a thrust bearing is disposed in the cylinder block and operatively associated with the piston shoes. When the cylinder block is rotated, the swash plate causes the piston shoes to reciprocate within the cylinder block. This movement of the piston shoes forces oil out of a cylinder so as to produce a substantial amount of force. To withstand high loads, the swash plate is resistant to wear and exhibits a high degree of lubricity.

Typically, a thrust bearing is composed of a steel plate as a backing plate and a bearing layer joined to one side of the backing plate. The bearing layer is made, for example, of a composite lead/bronze metal. The use of the steel plate presents high mechanical strength and reduces the fabrication cost of the thrust bearing. One example of fabricating a thrust bearing is to introduce a molten alloy into a mold wherein an elongated steel plate is placed. The molded article is passed between a set of rolls to reduce the thickness of the molded article to a predetermined level. A punching press is used to cut the molded article into a plurality of rings as thrust bearings. This process is, however, problematic since oxides and slag are formed during introduction of the molten alloy. Formation of oxides and slag retards sliding motion of a rotating body. It is, also, cumbersome to reduce the thickness of the molded article to a suitable level. Another example of fabricating a thrust bearing is to spray droplets of atomized metal wires against a backing plate. This process, known as a thermal spray process, is problematic since it is cumbersome to prepare metal wires. It is, also, time-consuming to coat the backing plate with the metal alloy. A further example of fabricating a thrust bearing is to press a web of bearing alloy and a web of steel plate against one another. The thrust bearing thus fabricated dose not withstand high loads since only a low degree of bonding strength between the bearing alloy and the steel plate is achieved.

Today, a sintering process is most widely used to fabricate a thrust bearing. In this process, alloy powder is uniformly distributed on one side of a web of steel plate and then, heated, say, to a temperature of 800° C. in a reducing atmosphere. During heating, the alloy powder is sintered to form a bearing layer which is, in turn, joined to the steel plate. The bearing layer is porous and thus, susceptible to damage upon exertion of high loads. To fill bores in the bearing layer, the sintered article is passed between a set of identical rolls. Thereafter, the roll-formed article is again heated to improve its integrity or bonding strength. A punching press is employed to cut the semifinished article into a shape suitable for use as a thrust bearing.

A disadvantage with the thrust bearing thus fabricated is that accurate adjustment of the thickness of the thrust bearing is troublesome. This is because the relatively soft bearing layer is more extended than the relatively hard backing plate when the sintered article is passed between the rolls. Another disadvantage is that the thrust bearing does not withstand high loads. During the roll-forming process, the bearing layer is pressed against the backing plate along its length. As a result, the bearing layer has a straight, parallel crystalline arrangement. Where a rotating body is slid in the direction of circumference of the thrust bearing, the rotating body is moved in a direction transverse to the crystalline direction of the bearing layer. This retards smooth sliding motion of the rotating body and causes separation or seizing of the bearing layer.

Accordingly, it is an object of the present invention to provide a durable thrust bearing and a method of fabricating a thrust bearing, which can withstand high loads and allows for accurate adjustment of the thickness of the thrust bearing.

SUMMARY OF THE INVENTION

According to one aspect of the present invention, there is provided a thrust bearing comprising a backing plate made of metal and a bearing layer made of metal alloy and joined to one side of the backing plate by a sintering process. The bearing layer is roll-formed in a spiral fashion. As a result, the bearing layer has a spiral crystalline arrangement. This arrangement facilitates sliding motion of a rotating body and effectively prevents mechanical fatigue or seizing of the bearing layer. A pair of bearing layers may be joined to opposite sides of the backing plate. The bearing layer is preferably made of a lead-free alloy composed, for example, of copper, tin and silver.

According to another aspect of the present invention, there is provided a method of fabricating a thrust bearing which comprises the steps of preparing an elongated metal plate, cutting the metal plate into a predetermined shape so as to provide a backing plate, evenly distributing alloy powder on one side of the backing plate, heating the backing plate and the alloy powder to a temperature below the melting point of the alloy powder in a reducing atmosphere whereby the alloy powder is bonded to form a bearing layer, and the bearing layer is also joined to the backing plate to provide a sintered article, rotating the sintered article about its central axis, roll-forming the sintered article in a spiral fashion by pressing the bearing layer against the backing plate, and heating the roll-formed article to a temperature below the melting point of the alloy powder in a reducing atmosphere.

During the roll-forming step, the bearing layer is pressed against the backing plate, as opposed to the prior art process wherein the bearing layer and the backing plate are pressed against one another between a pair of identical rolls. This step facilitates adjustment of the thickness of the thrust bearing.

DETAILED DESCRIPTION OF THE INVENTION

Figure 1:
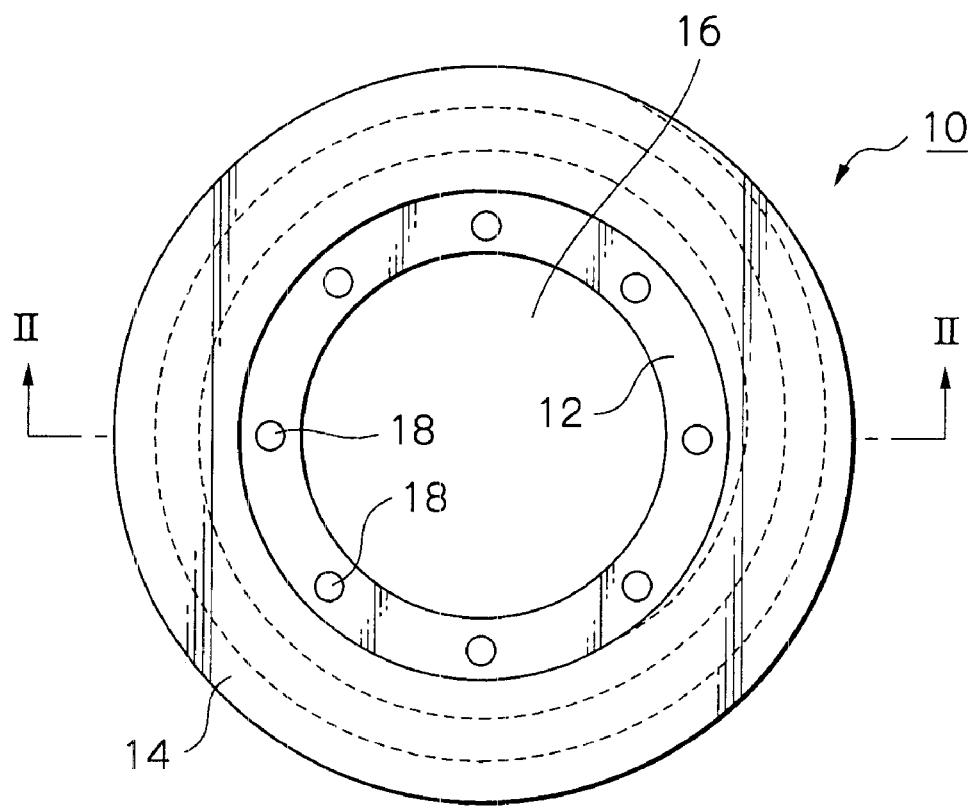
FIG. 1 is a top plane view of a thrust bearing made according to the present invention.
Figure 2:
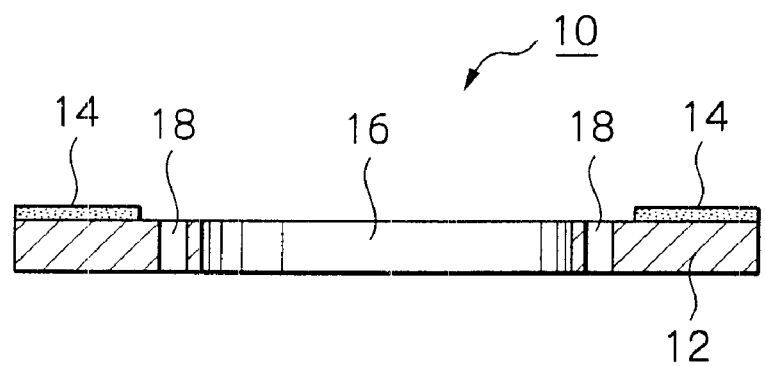
FIG. 2 is a sectional view taken on the line II—II of FIG. 1.
Figure 3:
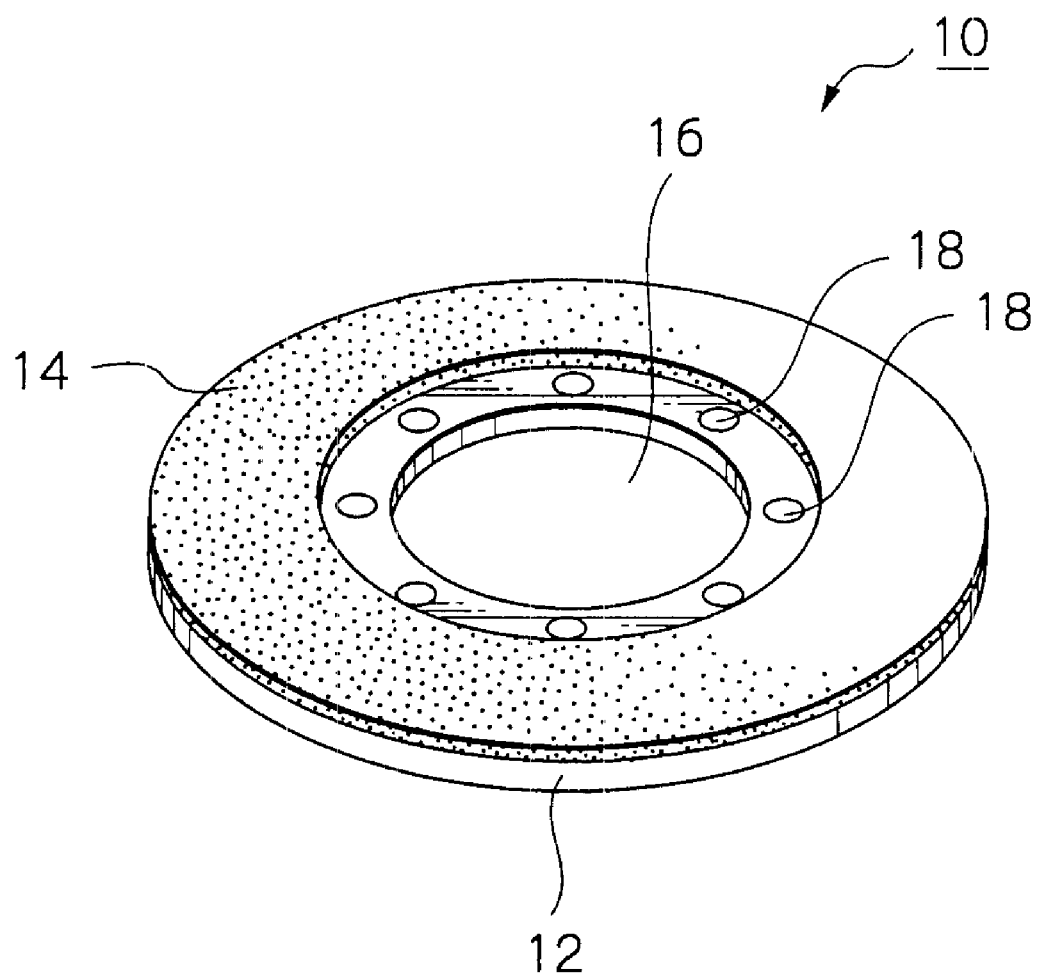
FIG. 3 is a perspective view of the thrust bearing shown in FIG. 1.
Figure 4A:
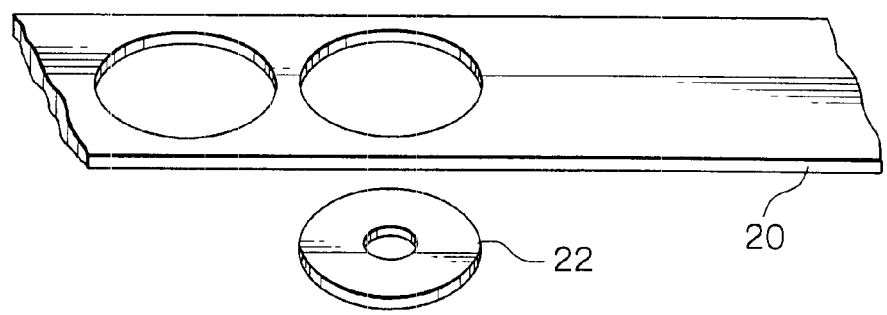
FIGS. 4(*a*) to 4(*e*) show the manner in which the thrust bearing shown in FIG. 1 is fabricated.
Figure 4B:
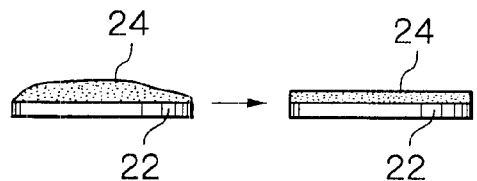
Figure 4C:
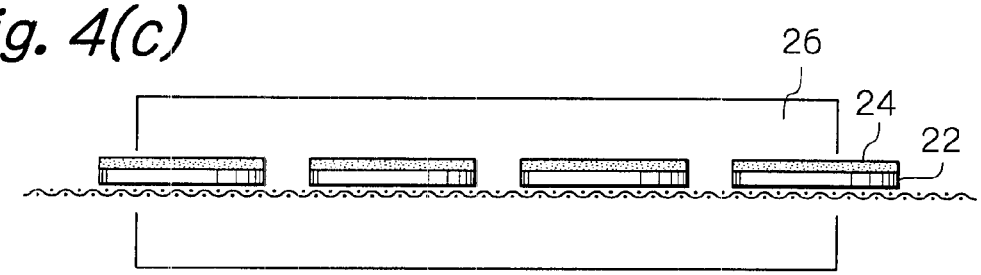
Figure 4D:
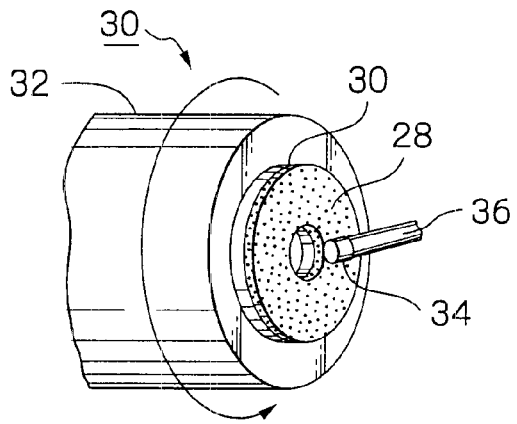
Figure 4E:
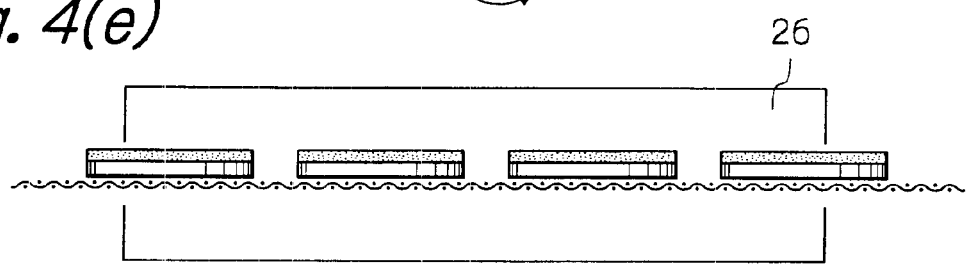

Referring to FIGS. 1 to 3, there is shown a thrust bearing 10 made according to the present invention. The thrust bearing 10 includes an annular backing plate 12 made of steel and an annular bearing layer 14 joined to one side of the annular plate 12 by a sintering process. Although not shown, a pair of bearing layers may be joined to opposite sides of the annular plate 12. The bearing layer 14 is preferably made of a lead-free alloy, composed, for example, of copper, tin and silver. The annular backing plate 12 has a centrally disposed aperture 16 through which a rotating body (not shown) extends, and a plurality of mounting holes 18 arranged around the aperture 16 at equal intervals. The bearing layer 14 extends outside of the mounting holes 18.

The thrust bearing 10 is fabricated as follows.

Referring to FIG. 4(*a*), a first step in the fabrication process is to prepare a clean rectangular plate 20 made of steel. The steel plate 20 is identical in thickness to the backing plate 12 of the thrust bearing 10 shown in FIG. 1. A press machine (not shown), for example, is used to die-cut circular preform rings 22. Alternatively, a laser cutter or similar means (not shown) may be employed. As shown in FIG. 4(*b*), an alloy 24 in powder form is deposited on the upper surface of each ring 22. The alloy powder 24 is then made substantially flat on the ring 22 so that the alloy powder 24 has a uniform thickness.

As shown in FIG. 4(*c*), the rings 22 with the alloy powder placed thereon are sequentially delivered to an sintering furnace 26. The sintering furnace 26 is filled with a reducing gas such as ammonia gas and heated to a temperature below the melting point of the alloy, say, approximately 800° C. During a sintering operation, the alloy powder 24 is bonded to form a bearing layer 28 which is joined to one side of the ring 22. The bearing layer 28 is porous. To fill pores formed in the bearing layer 28, a roll assembly 30 is prepared as shown in FIG. 4(*d*). The roll assembly 30 includes a large roll 32 and a small roll 34 carried by a shank 36. The small roll 34 has a central axis which extends in a direction substantially perpendicular to the axis of the large roll 32. The large roll 32 has a flat axial end adjacent to the small roll 34. One side of the ring 22 opposite the bearing layer 28 is mounted to the flat end of the large roll 32. While the large roll 32 is rotated about its own axis as shown by the arrow in FIG. 4(*d*), the small roll 34 is pressed against the bearing layer 28. At this time, the small roll 34 is moved radially inwardly from the outer circumferential edge of the bearing layer 28 at a constant speed. As such, the bearing layer 28 is roll-formed in a spiral fashion as shown in dash line in FIG. 1. This roll-forming operation enables the pores in the bearing layer 28 to collapse, but the bearing layer 28 is still susceptible to separation or breakage upon exertion of heavy loads. To improve bonding strength or integrity of the bearing layer 28, the semifinished article is again introduced into the sintering furnace 26 as shown in FIG. 4(*e*). As in the previous sintering operation, the sintering furnace 26 has a reducing atmosphere and is heated to a temperature of approximately 800° C. The roll assembly 30 may thereafter be operated to again press the bearing layer 28 against the ring when it is necessary to further adjust the thickness and hardness of the finished article as a thrust bearing.

Although the present invention has been described with respect to its preferred embodiments, it is to be understood that various changes and modifications may be made without departing from the scope of the invention as defined by the appended claims.

What is claimed is:

1. A thrust bearing comprising a backing plate made of metal and a bearing layer made of metal alloy and joined to a side of the backing plate by a sintering process, said bearing layer being roll-formed in a spiral fashion.

2. The thrust bearing of claim 1, wherein a pair of bearing layers are joined to opposite sides of the backing plate.

3. A method of fabricating a thrust bearing, comprising the steps of:

preparing an elongated metal plate;

cutting the metal plate into a predetermined shape so as to provide a backing plate;

evenly distributing alloy powder on one side of the backing plate;

heating the backing plate and the alloy powder to a temperature below a melting point of the alloy powder in a reducing atmosphere whereby the alloy powder is bonded to form a bearing layer, said bearing layer being joined to the backing plate to provide a sintered article;

rotating the sintered article about its central axis;

roll-forming the sintered article in a spiral fashion by pressing the bearing layer against the backing plate; and heating the roll-formed article to a temperature below the melting point of the alloy powder in a reducing atmosphere.

4. The method of claim 3, further comprising the step of roll-forming the article after the step of heating the roll-formed article.

\* \* \* \* \*